E. J. MADDEN.
SPRING SHACKLE.
APPLICATION FILED JAN. 22, 1920.
1,362,720.
Patented Dec. 21, 1920.
2 SHEETS—SHEET 2.
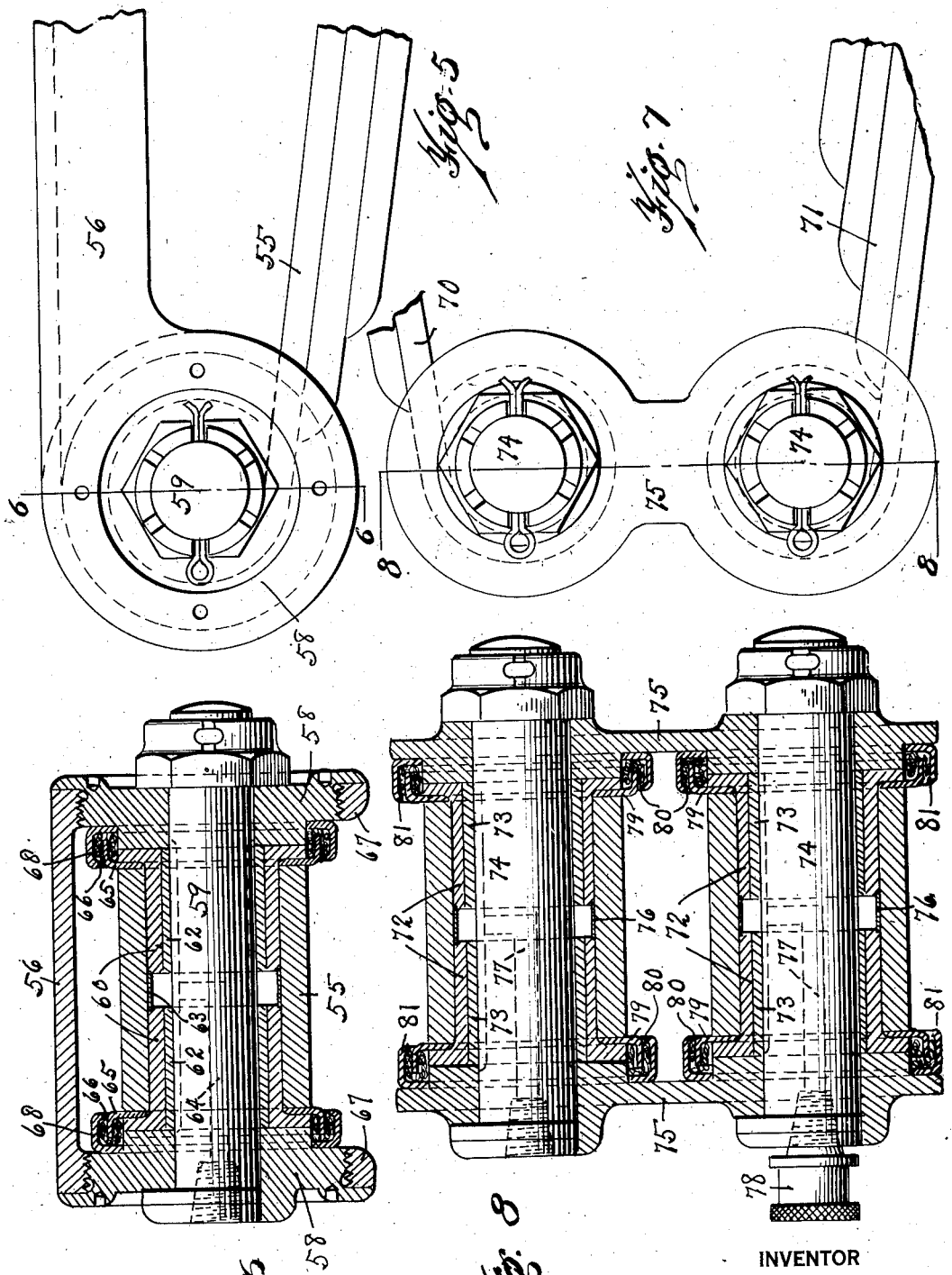
INVENTOR
Edward J. Madden
BY
Edward N. Pagelsen
ATTORNEY

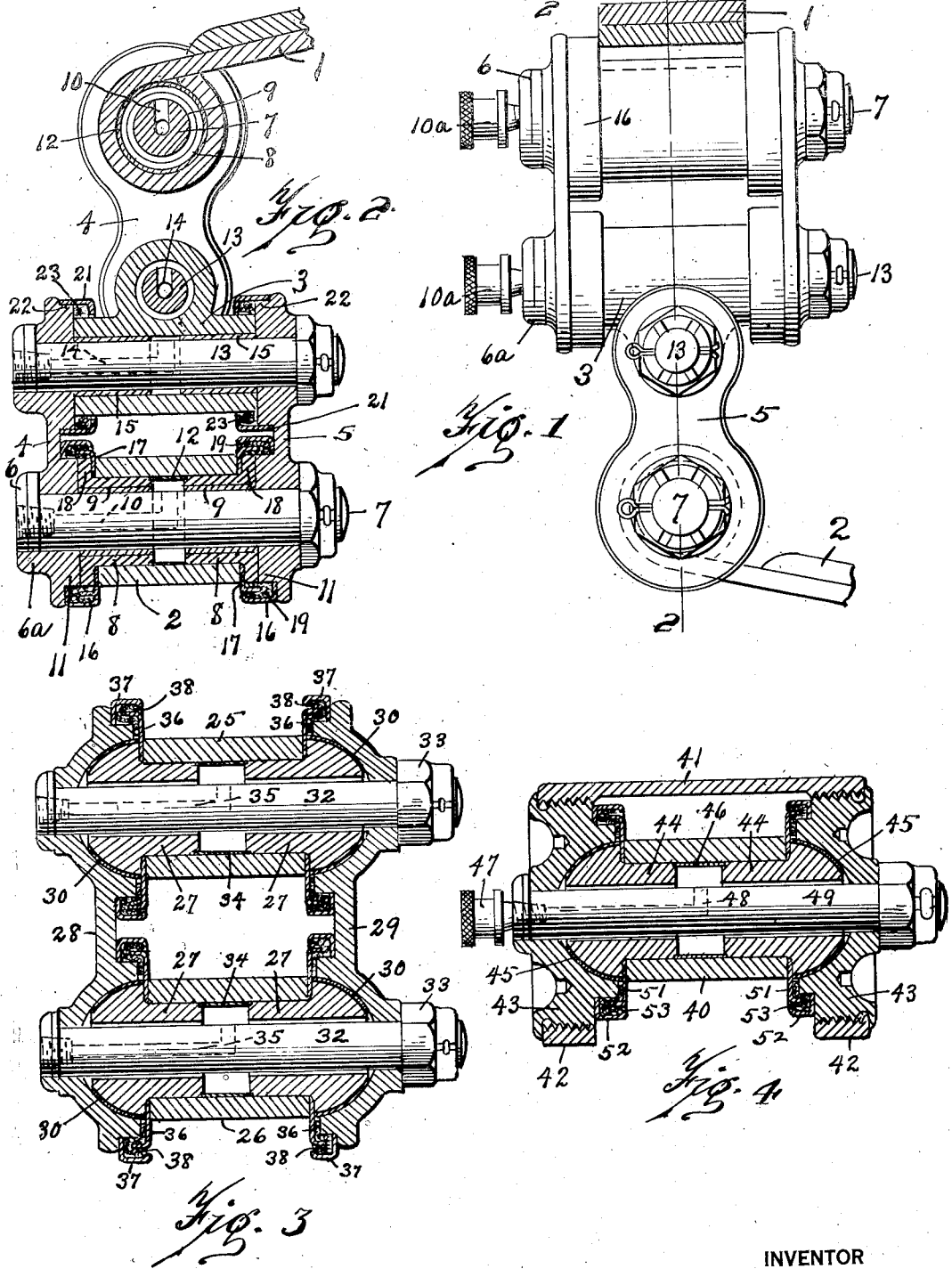

UNITED STATES PATENT OFFICE.

EDWARD J. MADDEN, OF DETROIT, MICHIGAN.

SPRING-SHACKLE.

1,362,720.                       Specification of Letters Patent.       Patented Dec. 21, 1920.

Application filed January 22, 1920. Serial No. 353,381.

*To all whom it may concern:*

Be it known that I, EDWARD J. MADDEN, a citizen of the United States, and residing at Detroit, in the county of Wayne and State of Michigan, have invented a new and Improved Spring-Shackle, of which the following is a specification.

This invention relates to means for connecting the ends of vehicle springs to the frames or chassis thereof, and its object is to provide a shackle construction which can be lubricated perfectly and wherein dust may be excluded from the working parts.

This shackle consists, in the combination of side links and bolts extending through these side links and through the ends of the springs and of the side bars of the vehicle frame, of a pair of bushings extending from the side links into the ends of the springs and frame, and of means for excluding dust from the joints between the bushings and the frame and springs respectively.

It also consists in providing a sealing ring for connecting the inner ends of the bushings so as to constitute a receptacle for the lubricant.

It also consists in forming the outer ends of the bushings substantially hemi-spherical and in making the holes through the bushings of greater diameters than the bolts so as to permit the parts to adjust themselves.

It also consists in the details of construction illustrated in the accompanying drawings and particularly pointed out in the claims.

In the accompanying drawings, Figure 1 is an elevation of a shackle embodying my invention. Fig. 2 is a section on the line 2—2 of Fig. 1. Fig. 3 is a central section of a second embodiment of the invention. Fig. 4 is a central section of a third embodiment of the invention. Fig. 5 is a side elevation of a fourth embodiment of the invention. Fig. 6 is a section on the line 6—6 of Fig.
5. Fig. 7 is a side elevation of a fifth embodiment of this invention. Fig. 8 is a section on the line 8—8 of Fig. 7.

Similar reference characters refer to like parts throughout the several views.
Spring shackles are designed to connect the ends of springs to the side bars of vehicles, particularly automobiles, or to the ends of other springs, and great trouble has been experienced with them because dust gets onto the bearing surfaces and because of the difficulty of keeping them lubricated. These two difficulties have been overcome by providing means for preventing the entrance of dust and by forming a storage chamber for the lubricant at the middle of the shackle.

In Figs. 1 and 2 which show a shackle especially adapted to connect springs 1 and 2 which are in planes at substantially right angles to each other, the structure really embodies two shackles connected by the T 3. Each shackle comprises side links 4 and 5, the links 4 having lugs 6ᵃ to engage the heads 6 of the bolts 7 and prevent them from turning. Extending into the springs 1 and 2 are thimbles 8, preferably formed with bushings 9 to furnish bearings for the bolts 7. The bolts are formed with passages 10 for the lubricant which lead from the oil cups 10ᵃ to the chambers between the inner ends of the bushings and rings 12 may be provided to prevent the lubricant from flowing away too freely. The bearing of the bolts and the engaging surfaces of the ends of the bushings and circular shoulders 11 on the side links 4 and 5 will be properly lubricated.

The bolts 13 which connect the side links to the T 3 may be smaller than the bolts 7 as the wear on them is not so great as on the bolts 7. Passages 14 for lubricant will however be provided and I also prefer to employ the bearing sleeves 15. No rings 12 are necessary however.

To prevent dust entering between the side links 4 and 5 and the outer ends of the bushings 9, I mount a ring 16 on the circular shoulders 11 on the side links and secure other rings 17 between the flanges 18 on the outer ends of these bushings 9 and the springs 1 and 2. Between the cylindrical flanges on these rings the packing rings 19 of some fibrous material will be placed to retain a certain amount of lubricant and to intercept all dust which might be thrown against this shackle.

Simple dust intercepters consist in the rings 21 mounted on the circular shoulders 22 of the links and the packing rings 23 of fibrous material.

The structure shown in Fig. 3 is adapted to connect the ends 25 and 26 of two springs which are in substantially the same plane. The bushings 27 have substantially spherical ends which extend into seats formed in the links 28 and 29. Spherical caps 30 over the outer ends of the bushings may be of bronze or other good anti-friction metal.

Bolts 32 extend through the links and the bushings and nuts 33 are on the outer ends of the bolts. Rings 34 prevent the escape of lubricant which may enter the spaces between the inner ends of the bushings through the passages 35 in the bolts.

The means for excluding dust are the same as shown in Fig. 2, consisting of the two rings 36 and 37 with the fibrous material 38 between them. It will be noticed that the holes in the bushings 27 are larger in diameter than the bolts 32 which permits the various parts to adjust themselves.

In Fig. 4 I have shown a single shackle adapted to constitute a close connection between the end 40 of a spring and a channel bar 41 of a vehicle. This channel has side flanges 42 which are drilled and tapped to receive the plugs 43 which are formed with hemi-spherical seats for the spherical ends of the bushings 44. In this case again there are thin hemi-spherical caps 45 to reduce the friction, and a ring 46 between the ends of the bushings to constitute a retainer for the lubricant which is forced in by the grease cup 47 through the passage 48 in the bolt 49. Dust excluding rings 51, 52 and 53 are again employed.

The holes in the bushings 44 are of sufficient size to permit free movement of the bolt 49, and the spring may therefore adjust itself relative to the channel bar.

In Figs. 5 and 6 I have again shown a close connection between the end of a spring 55 and the front end of a side bar 56 of a vehicle frame. The end of the frame is rounded to constitute circular flanges 67 which are drilled and tapped to receive the plugs 58 through which the bolt 59 extends. The bushings 60 extend into the eye at the end of the spring and are provided with bearing sleeves 62 for the bolt. A ring 63 prevents the loss of the lubricant which is introduced through the passage 64 in the bolt. Dust is excluded by means of the rings 65, 66 and 68 previously described.

The construction of the several parts of the shackle shown in Figs. 7 and 8 are much like those shown in Figs. 5 and 6. The springs 70 and 71 receive the thimbles 72 which have bearing sleeves 73 for the bolts 74 which hold the side links 75 in position. The rings 76 again form the circumferential walls of the chambers for the lubricant which may be forced in through the passages 77 by grease cups 78. Dust is excluded from the bearings by means of the metal rings 79 and 80 and the fibrous packing 81.

In all these several embodiments, the rough-bent eyes at the ends of the springs receive accurately machined bushings which are rigidly held from turning in these eyes. Each bushing is preferably provided with a sleeve of metal which will be subject to minimum wear. Each bushing has a flange at its outer end between which and the adjacent side of the spring is firmly held a packing ring which is L-shaped in cross section and which telescopes a second ring mounted on a circular shoulder on the adjacent side link or part of the vehicle, and between these two rings a dust excluding ring of fibrous material is mounted. The bolts which hold the parts in position may be of full strength as there is ample room for them. As the eyes at the ends of the springs are bent hot and are not usually perfectly closed, small rings are mounted between the inner ends of the bushings to constitute the outer walls of lubricant chambers. The structures are therefore of maximum strength, they are perfectly fitted together, and because of the absence of dust, there is a minimum of wear.

The sizes and proportions of the various details may all be changed by those skilled in the art without departing from the spirit of my invention as set forth in the following claims.

I claim:—

1. In a spring shackle, the combination with the eye at the end of a vehicle spring, of a pair of bushings extending into said eye, a bolt extending through the bushings, supporting members mounted on the bolt and secured to the spring thereby, and dust-excluding rings mounted on the bushings and said supporting members.

2. In a spring shackle, the combination with the eye at the end of a vehicle spring, of a pair of bushings extending into said eye, a bolt extending through the bushings, supporting members mounted on the bolt and secured to the spring thereby, and dust-excluding rings mounted on the bushings and said supporting members and having telescoping flanges and fibrous material between the flanges.

3. In a spring shackle, the combination with the eyes at the ends of two adjacent vehicle springs, of a pair of bushings extending into each eye, a bolt extending through each pair of bushings, side links mounted on the bolts and secured thereby to the ends of the two springs, said links being formed with circular bosses to engage the outer ends of the bushings, and dust-excluding rings mounted on the bushings and on said circular bosses.

4. In a spring shackle, the combination with the eyes at the ends of two adjacent vehicle springs, of a pair of bushings extending into each eye, a bolt extending through each pair of bushings, side links mounted on the bolts and secured thereby to the ends of the two springs, said links being formed with circular bosses to engage the outer ends of the bushings, and dust-excluding rings mounted on the bushings and on said circular bosses in pairs, the rings of each pair having telescoping flanges and fibrous material between the rings of each pair.

5. In a spring shackle, the combination with the eye at the end of a vehicle spring, of a pair of bushings extending into said eye and having circumferential flanges just outside of the eye, supporting members having bosses concentric with said bushings, dust-excluding rings mounted on said bosses and comprising cylindrical flanges, other rings mounted adjacent the first and having radial portions clamped between the spring and the flanges on the bushings and also having cylindrical flanges telescoping with the cylindrical flanges on the first named rings, and a bolt extending through the supporting members and said bushings.

6. In a spring shackle, the combination with the eyes at the ends of two adjacent vehicle springs, of a pair of bushings extending into each eye and having substantially hemi-spherical outer ends, a bolt extending through each pair of bushings, and side links mounted on the bolts and formed with spherical depressions to receive the hemi-spherical ends of the bushings.

7. In a spring shackle, the combination with the eyes at the ends of two adjacent vehicle springs, of a pair of bushings extending into each eye and having substantially hemi-spherical outer ends, a bolt extending through each pair of bushings, side links mounted on the bolts and formed with spherical depressions to receive the hemi-spherical ends of the bushings, and cup shaped bearing members interposed between the links and the ends of the bushings.

8. In a spring shackle, the combination with the eyes at the ends of two adjacent vehicle springs, a pair of bushings extending into each eye and having substantially hemi-spherical outer ends, a bolt extending through each pair of bushings, and side links mounted on the bolts and formed with spherical depressions to receive the hemi-spherical ends of the bushings, said bolts being formed with passages for lubricant extending from one end to the space between the inner ends of the bushings, and a ring connecting to said inner ends of the bushings to constitute a chamber to hold lubricant.

9. In a spring shackle, the combination with the eyes at the ends of two adjacent vehicle springs, a pair of bushings extending into each eye and having substantially hemi-spherical outer ends, a bolt extending through each pair of bushings, side links mounted on the bolts and formed with spherical depressions to receive the hemi-spherical ends of the bushings, and dust-excluding metal rings mounted on the bushings and on said side links and comprising telescoping portions, and fibrous rings between the metal rings.

EDWARD J. MADDEN.